US010333356B2

(12) United States Patent
Ding et al.

(10) Patent No.: US 10,333,356 B2
(45) Date of Patent: Jun. 25, 2019

(54) ELECTRONIC BUSINESS CARD INFORMATION EXCHANGE METHOD AND DEVICE

(71) Applicant: ORA INC., Beijing (CN)

(72) Inventors: Lei Ding, Beijing (CN); Jiajia Han, Beijing (CN); Huan Liu, Beijing (CN); Yongwei Wang, Beijing (CN); Jianguo Wu, Beijing (CN); Ye Zhao, Beijing (CN)

(73) Assignee: ORA INC., Beijing (CN)

( * ) Notice: Subject to any disclaimer, the term of this patent is extended or adjusted under 35 U.S.C. 154(b) by 70 days.

(21) Appl. No.: 15/503,960

(22) PCT Filed: Aug. 12, 2015

(86) PCT No.: PCT/CN2015/086793
§ 371 (c)(1),
(2) Date: Feb. 14, 2017

(87) PCT Pub. No.: WO2016/023496
PCT Pub. Date: Feb. 18, 2016

(65) Prior Publication Data
US 2017/0279314 A1    Sep. 28, 2017

(30) Foreign Application Priority Data
Aug. 14, 2014   (CN) .......................... 2014 1 0400264

(51) Int. Cl.
*G06K 19/06*    (2006.01)
*H02J 50/20*    (2016.01)
(Continued)

(52) U.S. Cl.
CPC .............. *H02J 50/20* (2016.02); *G06Q 10/10* (2013.01); *H02J 50/10* (2016.02); *H02J 50/80* (2016.02);
(Continued)

(58) Field of Classification Search
CPC ........ G06Q 10/107; H02J 50/10; H02J 50/20; H02J 50/80; H04B 5/0025; H04B 5/0031;
(Continued)

(56) References Cited

U.S. PATENT DOCUMENTS

| 6,533,171 B1 * | 3/2003 | Porter ................. G06Q 10/107 235/380 |
| 7,150,407 B1 * | 12/2006 | Berger ................ G06K 7/0008 235/492 |

(Continued)

FOREIGN PATENT DOCUMENTS

| CN | 101345793 A | 1/2009 |
| CN | 202135126 U | 2/2012 |

(Continued)

OTHER PUBLICATIONS

Chinese Search Report based on Chinese publication No. CN104184500A.
(Continued)

*Primary Examiner* — Thien M Le
*Assistant Examiner* — April A Taylor

(57) ABSTRACT

An electronic business card information exchange method and device are provided in the present invention. The electronic business card exchange is achieved by way of by way of receiving by a first terminal in a power-off state an induced electric energy provided by a second terminal, sending by the first terminal the first electronic business card information stored locally to the second terminal under the driving of the induced electric energy, then receiving and storing second electronic business card information written by the second terminal. The technical problem in the prior art that the electronic business card information exchange can not be achieved when one of two terminals is in a power-off state is solved.

4 Claims, 3 Drawing Sheets

(51) Int. Cl.
  *H04W 4/80* (2018.01)
  *G06Q 10/10* (2012.01)
  *H02J 50/10* (2016.01)
  *H02J 50/80* (2016.01)
  *H04B 5/00* (2006.01)

(52) U.S. Cl.
  CPC ............ *H04W 4/80* (2018.02); *H04B 5/0025* (2013.01); *Y02D 70/00* (2018.01)

(58) Field of Classification Search
  CPC ....... H04B 5/0037; H04W 4/80; Y02D 70/21; Y02D 70/22
  See application file for complete search history.

(56) References Cited

U.S. PATENT DOCUMENTS

| | | | | |
|---|---|---|---|---|
| 10,057,744 | B2* | 8/2018 | Keller | .................. H04B 5/0031 |
| 2013/0260689 | A1* | 10/2013 | Haverinen | ........... H04B 5/0031 455/41.2 |

FOREIGN PATENT DOCUMENTS

| | | |
|---|---|---|
| CN | 102711046 A | 10/2012 |
| CN | 102722649 A | 10/2012 |
| CN | 102780515 A | 11/2012 |
| CN | 103475077 A | 12/2013 |
| CN | 103780698 A | 5/2014 |
| CN | 104184500 B | 1/2017 |
| KR | 20130046243 A | 5/2013 |
| TW | 201338331 A | 9/2013 |
| TW | 201412048 A | 3/2014 |
| TW | I550532 B | 9/2016 |

OTHER PUBLICATIONS

Taiwanese Search Report based on Taiwanese publication No. TWI550532.

* cited by examiner

ELECTRONIC BUSINESS CARD INFORMATION EXCHANGE METHOD AND DEVICE

TECHNICAL FIELD

The present invention is related to information technology, and more particular to an electronic business card information exchange method and device.

RELATED ART

Electronic business card information is a new form for business card using an electronic document to record the entire information of a traditional paper business card. The representation of the electronic business card information may not only include text and static picture but also multimedia information, such as dynamic image, sound and so on. The electronic business card information may be stored in mobile terminals. User may use the communication connection between the mobile terminals to exchange the electronic business cards. The terminal may specifically be a common intelligent terminal or may be an electronic business card terminal specifically used for exchanging electronic business card information.

In the prior art, a point to point communication manner is frequently employed for the electronic business card information between two terminals. Since this communication manner needs to be performed when the two terminals have the electricity, the electronic business card information exchange may not be achieved when one terminal of the two terminal is powered off.

SUMMARY

The present invention provides an electronic business card information exchange method and device, so as to achieve the electronic business card information exchange when one of two terminals is in a power-off state.

A first aspect of the present invention provides an electronic business card information exchange method, which includes:

a first terminal in a power-off state obtaining an induced electric energy provided by a second terminal;

the first terminal sending first electronic business card information stored locally to the second terminal under the driving of the induced electric energy;

the first terminal receiving and storing second electronic business card information written by the second terminal under the driving of the induced electric energy.

A second aspect of the present invention provides an electronic business card information exchange method, which includes:

a second terminal providing an induced electric energy to a first terminal in a power-off state;

the second terminal receiving first electronic business card information sent by the first terminal under the driving of the induced electric energy;

the second terminal writing second electronic business card information stored locally to the first terminal, such that the first terminal receives and stores the second electronic business card information under the driving of the induced electric energy.

A third aspect of the present invention provides an electronic business card information exchange device, the electronic business card information exchange device is configured in a first terminal, the first terminal is an electronic business card terminal, and the electronic business card information exchange device includes:

a power supplying module, for obtaining an induced electric energy provided by a second terminal under the first terminal is in a power-off state;

a first driving module, for sending first electronic business card information stored locally to the second terminal under the driving of the induced electric energy;

a second driving module, for receiving and storing second electronic business card information written by the second terminal under the driving of the induced electric energy.

A fourth aspect of the present invention provides an electronic business card information exchange device, the electronic business card information exchange device is configured in a second terminal, the second terminal is an electronic business card terminal, and the electronic business card information exchange device includes:

a power supplying module, for providing an induced electric energy to a first terminal in a power-off state;

a receiving module, for receiving first electronic business card information sent by the first terminal under the driving of the induced electric energy;

a writing module, for writing second electronic business card information stored locally to the first terminal, such that the first terminal receives and stores the second electronic business card information under the driving of the induced electric energy.

An electronic business card information exchange method and device are provided in the present invention. The electronic business card exchange is achieved by way of receiving an induced electric energy provided by a second terminal by a first terminal in a power-off state, sending by the first terminal first electronic business card information stored locally to the second terminal under the driving of the induced electric energy, and receiving and storing second electronic business card information written by the second terminal. The technical problem in the prior art that the electronic business card information exchange can not be achieved when one of two terminals is in a power-off state is solved.

DETAILED DESCRIPTION

Figure 1:
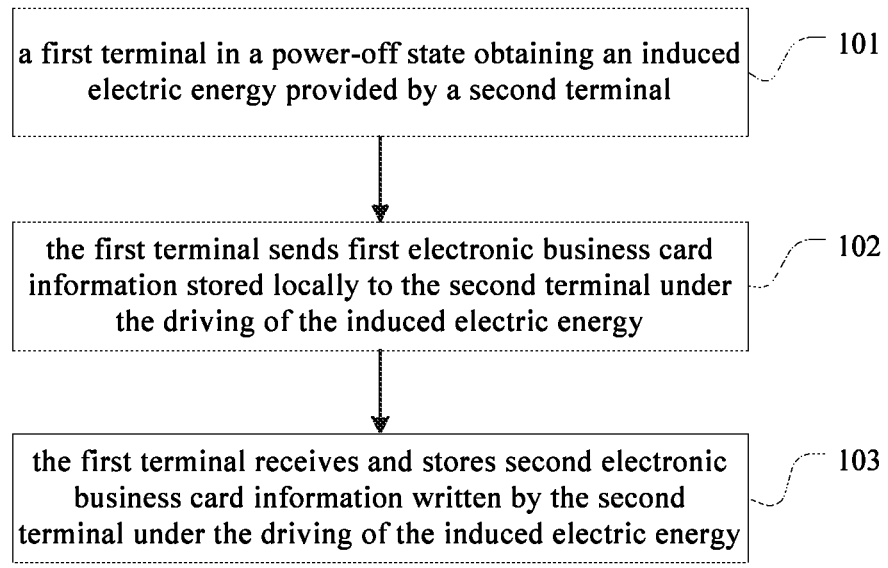
FIG. 1 is a flowchart of an electronic business card information exchange method according to one embodiment of the present invention.

FIG. 1 is a flowchart of an electronic business card information exchange method according to one embodiment of the present invention. The method provided by the embodiment may be used for exchanging electronic business card information between two terminals. The two terminals may be ordinary smart terminals or electronic business card terminals and referred as a first terminal and a second terminal. In the embodiment, the first terminal is in a power-off state, and the second terminal is in a power-on state. As shown in FIG. 1, the electronic business card information exchange method includes:

101: a first terminal in a power-off state obtaining an induced electric energy provided by a second terminal.

Optionally, the first terminal obtains the induced electric energy by adopting a near filed communication (NFC) of a card mode. Specifically, when the first terminal is in an electricity and power-on state, the first terminal and the second terminal may use respective individual near field communication (NFC) chip to achieve a point to point (P2P) communication. The first terminal detects the remaining electricity in real time. When the first terminal detects that the remaining electricity thereof is less than a predetermined threshold, the first terminal switches the working state of the NFC chip configured inside the first terminal to a card mode. In the situation that the first terminal is in the power-off state due to no electricity, if the first terminal which is in the power-off state approaches the second terminal, since the second terminal is in the power-on state, the NFC chip thereof may work in a reading and writing mode or the card mode, and may also work in the P2P mode. The second terminal provides the induced electric energy to the NFC chip of the first terminal through an induction coil, so as to drive the NFC chip of the first terminal to achieve the corresponding function. Further, before the first terminal obtains the induced electric energy by adopting a near filed communication (NFC) of the card mode, the first terminal detects a remaining electricity in the power-on state; if the remaining electricity is less than the predetermined threshold, the first terminal switches the communication manner to the NFC manner of the card mode.

Or, optionally, the first terminal obtains the induced electric energy by adopting a wireless charging manner.

102: the first terminal sends first electronic business card information stored locally to the second terminal under the driving of the induced electric energy.

Specifically, the second terminal provides the induced electric energy and may achieve a first communication with the first terminal at the same time. Through the first communication, the second terminal identifies that the first terminal is in the power-off state and the NFC chip of the first terminal works in the card mode. At this time, if the NFC chip of the second terminal works in the P2P mode or the card mode, the second terminal switches the working state of the NFC chip of the second terminal to the reading and writing mode, i.e. the second terminal switches the communication manner to the NFC manner of the reading and writing mode, such that the first terminal uses the NFC chip of the first terminal worked in the card mode to send first electronic business card information stored locally to the second terminal under the driving of the induced electric energy. The second terminal actively reads the first electronic business card information stored by a storage module in the first terminal. That is, the second terminal sends a read instruction to the NFC chip of the first terminal through a protocol. After the NFC chip of the first terminal receives the read instruction, it reads the first electronic business card information from the storage module through a communication interface, then sends the first electronic business card information to the second terminal through the antenna of the first terminal.

Further, after the first terminal is powered off, CPU may read, write and operate the NFC chip through a CPU bus interface, such as IIC interface, SPI interface, high-speed serial interface, etc. The NFC chip configures the first electronic business card information according to a first reading and writing instruction sent by an application run on the CPU, then may adopt an encryption manner to write the first electronic business card information to the storage module through a communication interface linked with the NFC chip and the storage module, so as to achieve the configuration of the first electronic business card information, i.e. the encryption document of the first electronic business card information is stored in the storage module to ready-for-use. Afterward, if the user modifies the first electronic business card information, the process thereof is also the same as the above configuration process, it may be updated in real time and conveniently operated for the user. The user only needs using a plaintext manner to design the business card, and other processes do not require the intervention from the user.

103: the first terminal receives and stores second electronic business card information written by the second terminal under the driving of the induced electric energy.

Specifically, the second terminal lunches the second electronic business card information stored locally thereof to a write instruction, and sends the write instruction through the protocol. After the first terminal receives the write instruction, the NFC chip of the first terminal write the second electronic business card information in the write instruction to a chip memory through the communication interface.

It should be noted that the exchanging process and the storing process of the above first electronic business card information and second electronic business card information may adopt an encrypted document manner, so as to improve the safety of the information.

Further, after the first terminal is powered on, the first terminal stores the second electronic business card information stored by the NFC chip to the storage module of the first terminal. In addition, after the first terminal is powered on, it may further display the second electronic business card information. Specifically, after the first terminal is powered on, CPU reads, writes and operates the NFC chip through CPU bus interface, such as IIC interface, SPI interface, high-speed serial interface, etc., such that the NFC chip reads the exchanged business card according to a second reading and writing instruction sent by the application run on the CPU. Specifically, the encrypted and stored second electronic business card information is read from the storage module through the communication interface linked with the NFC ship and the storage module, so as to finish the reading. The read second electronic business card information is returned to the application through the CPU bus interface. It recovers to plaintext after decrypting and is displayed to the user. The user may store the plaintext to the storage module for permanently storing in a manner of database or encryption document through the application. After it is stored, the user may decide whether to preserve the data of the storage module. If the data of the storage module is not preserved, the temporary data of the storage module may be deleted through the CPU bus interface, so as to release the space.

It should be noted that the storage modules in the first terminal and the second terminal mentioned in the embodiment are hardwares independent from the NFC chip.

In the embodiment, after an induced electric energy provided by a second terminal is received by a first terminal in a power-off state, the first terminal sends first electronic business card information stored locally to the second terminal under the driving of the induced electric energy, then receives and stores second electronic business card information written by the second terminal. The electronic business card exchange is achieved, and the technical problem in the prior art that the electronic business card information exchange can not be achieved when one of two terminals is in a power-off state is solved.

Figure 2:
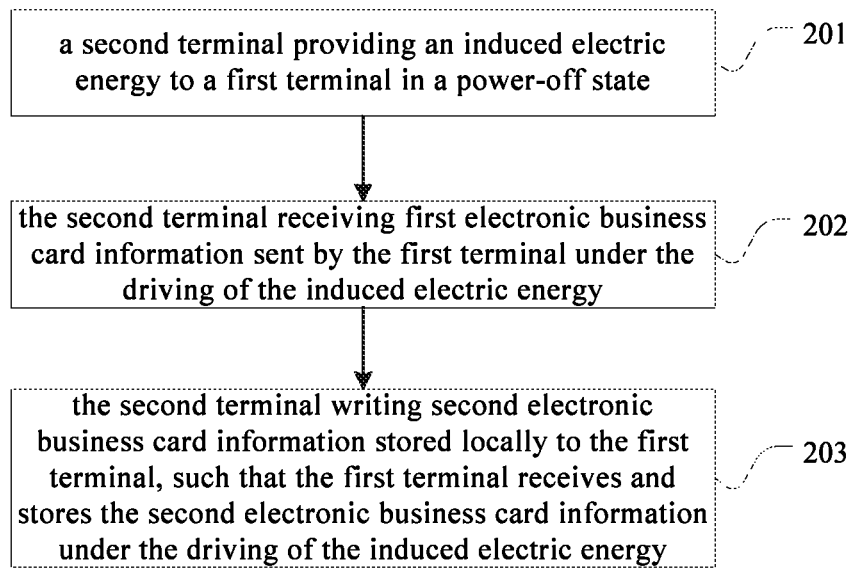
FIG. 2 is a flowchart of an electronic business card information exchange method according to another embodiment of the present invention.

FIG. 2 is a flowchart of an electronic business card information exchange method according to another embodiment of the present invention. The method provided by the embodiment may be used for performing an electronic business card information exchange on two terminals. The two terminals may be ordinary smart terminal or electronic business card terminal and referred as a first terminal and a second terminal. In the embodiment, the first terminal is in a power-off state, and the second terminal is in a power-on state. As shown in FIG. 2, the electronic business card information exchange method includes:

201: a second terminal providing an induced electric energy to a first terminal in a power-off state.

Optionally, the second terminal provides the induced electric energy to the first terminal by adopting a near filed communication (NFC) of a reading and writing mode. Specifically, when the first terminal has electricity and in a power-on state, the first terminal and the second terminal may use respective near field communication (NFC) chip to achieve a point to point (P2P) communication. The first terminal detects a remaining electricity in real time, and when the first terminal detects that the remaining electricity thereof is less than a predetermined threshold, the first terminal switches a working state of the NFC chip configured inside the first terminal to a card mode. In the situation that the first terminal is in the power-off state due to no electricity, if the first terminal which is in the power-off state approaches the second terminal, since the second terminal is in the power-on state, the NFC chip thereof works in a reading and writing mode or the card mode, and may also work in the P2P mode. The second terminal provides the induced electric energy to the NFC chip of the first terminal through a sensing antenna, so as to drive the NFC chip of the first terminal to achieve the corresponding function.

Or, optionally, the second terminal provides the induced electric energy by adopting a wireless charging manner.

202: the second terminal receiving first electronic business card information sent by the first terminal under the driving of the induced electric energy.

Specifically, the second terminal provides the induced electric energy and may achieve a first communication with the first terminal at the same time. Through the first communication, the second terminal identifies that the first terminal is in the power-off state and the NFC chip of the first terminal works in the card mode. If the second terminal identifies that the NFC chip of the first terminal works in the card mode, the second terminal switches the working state of the NFC chip of the second terminal to the reading and writing mode, i.e. after the second terminal provides the induced electric energy by adopting the NFC manner of non-reading and non-writing mode, the second terminal identifies that the communication manner of the first terminal is the NFC manner of the card mode, the second terminal switches the communication manner thereof to the NFC manner of the reading and writing mode. The second terminal actively reads the first electronic business card information stored in a storage module in the first terminal. That is, the second terminal sends a read instruction to the NFC chip of the first terminal through a protocol. After the NFC chip of the first terminal receives the read instruction, it reads the first electronic business card information from the storage module through a communication interface, then sends the first electronic business card information to the second terminal through the antenna of the first terminal. The second terminal receives and stores the first electronic business card information sent by the first terminal under the driving of the induced electric energy.

203: the second terminal writing second electronic business card information stored locally to the first terminal, such that the first terminal receives and stores the second electronic business card information under the driving of the induced electric energy.

Specifically, the second terminal launches the second electronic business card information stored locally thereof to a write instruction, and sends the write instruction through the protocol. After the first terminal receives the write instruction, the NFC chip of the first terminal write the second electronic business card information carried in the write instruction to a chip memory through the communication interface.

It should be noted that the exchanging process and the storing process of the above first electronic business card information and second electronic business card information may adopt an encrypted document manner, so as to improve the safety of the information.

In addition, it should be noted that the storage module in the first terminal and the second terminal mentioned in the embodiment are hardwares independent from the NFC chip.

In the embodiment, after a induced electric energy provided by a second terminal is received by a first terminal in a power-off state, the first terminal sends first electronic business card information stored locally to the second terminal under the driving of the induced electric energy, then receives and stores second electronic business card information written by the second terminal. The electronic business card exchange is achieved, and the technical problem in the prior art that the electronic business card information exchanging can not be achieved when one of two terminals is in a power-off state is solved.

Figure 3:
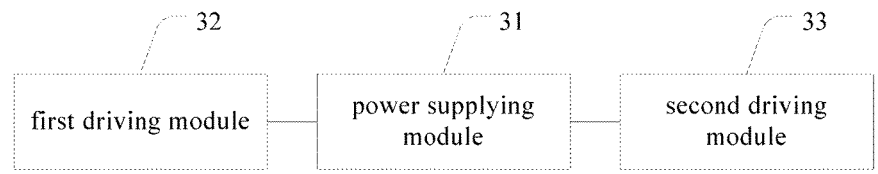
FIG. 3 is a schematic structure view of an electronic business card information exchange device according to one embodiment of the present invention.

FIG. 3 is a schematic structure view of an electronic business card information exchange device according to one embodiment of the present invention. The electronic business card information exchange device provided by the embodiment is configured in a first terminal in a power-off state and used for performing the electronic business card information exchanging with a second terminal, and the two terminals may be electronic business card terminals. As shown in FIG. 3, the electronic business card information exchange device includes: a power supplying module 31, a first driving module 32 and a second driving module 33.

The power supplying module 31 is used for obtaining an induced electric energy provided by a second terminal in the situation that the first terminal is in a power-off state.

The first driving module 32 is connected to the power supplying module 31 and is used for sending first electronic business card information stored locally to the second terminal under the driving of the induced electric energy.

Specifically, the second terminal actively reads the first electronic business card information stored by a storage module in the first terminal. That is, the second terminal sends a read instruction to the NFC chip of the first terminal through a protocol. After the first driving module 32 of the NFC chip receives the read instruction, it reads the first electronic business card information from the storage module through a communication interface, then sends the first electronic business card information to the second terminal through the antenna of the first terminal.

The second driving module 33 is connected to the power supplying module 31 and is used for receiving and storing second electronic business card information written by the second terminal under the driving of the induced electric energy.

In the embodiment, The electronic business card exchanging is achieved by way of receiving by a first terminal in a power-off state an induced electric energy provided by a second terminal, sending by the first terminal the first electronic business card information stored locally to the second terminal under the driving of the induced electric energy, then receiving and storing second electronic business card information written by the second terminal. The technical problem in the prior art that the electronic business card information exchange can not be achieved when one of two terminals is in a power-off state is solved.

Figure 4:
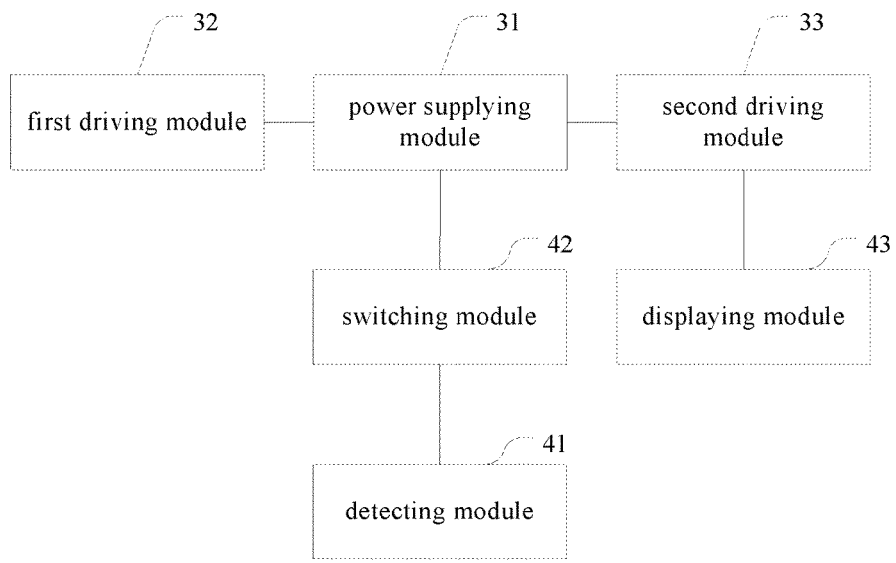
FIG. 4 is a schematic structure view of another electronic business card information exchange device according to one embodiment of the present invention.

FIG. 4 is a schematic structure view of another electronic business card information exchange device according to one embodiment of the present invention. On the basis of the above embodiment, the electronic business card information exchange device of the embodiment further includes: a detecting module 41, a switching module 42 and a displaying module 43.

The power supplying module 31 is specifically used for obtaining the induced electric energy by adopting a near field communication (NFC) manner of a card mode.

Based on this, the detecting module 41 is used for detecting a remaining electricity.

The switching module 42 is connected to the detecting module 41 and the power supplying module 31, used for if the remaining electricity is less than a predetermined threshold, switching the communication manner to the NFC manner of the card mode.

Specifically, the detecting module 41 of the first terminal detects the remaining electricity in real time, when the detecting module 41 detecting that the remaining electricity is less than the predetermined threshold, the switching module 42 switches the working state of the NFC chip configured inside the first terminal to the card mode.

The displaying module 43 is connected to the second driving module 33 and is used for after the first terminal is powered on, displaying the second electronic business card information.

In the embodiment, the electronic business card exchanging is achieved by way of receiving by a first terminal in a power-off state an induced electric energy provided by a second terminal, sending by the first terminal the first electronic business card information stored locally to the second terminal under the driving of the induced electric energy, then receiving and storing second electronic business card information written by the second terminal, and the technical problem in the prior art that the electronic business card information exchanging can not be achieved when one of two terminals is in a power-off state is solved.

Figure 5:
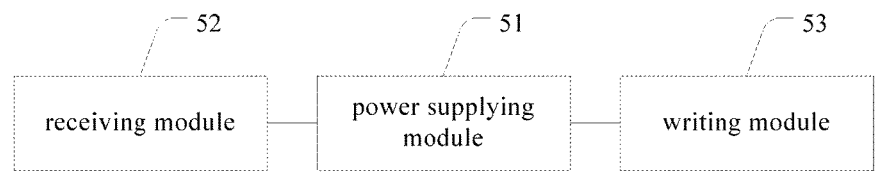
FIG. 5 is a schematic structure view of an electronic business card information exchange device according to another embodiment of the present invention.

FIG. 5 is a schematic structure view of an electronic business card information exchange device according to another embodiment of the present invention. The electronic business card information exchange device provided by the embodiment is configured in a second terminal and used for performing the electronic business card information exchange with a first terminal in a power-off state, and the two terminals may be electronic business card terminals. The electronic business card information exchange device includes: a power supplying module 51, a receiving module 52 and a writing module 53.

The power supplying module 51 is used for providing an induced electric energy to a first terminal in a power-off state.

Specifically, in the situation that the first terminal which is in the power-off state approaches the second terminal, since the second terminal is in the power-on state, the NFC chip thereof works in a reading and writing mode or the card mode, and may also work in the P2P mode. The power supplying module 51 provides the induced electric energy to the NFC chip of the first terminal through an induction coil, so as to drive the NFC chip of the first terminal to achieve the corresponding function.

The receiving module 52 is connected to the power supplying module 51 and is used for receiving first electronic business card information sent by the first terminal under the driving of the induced electric energy.

Specifically, the receiving module 52 of the second terminal actively reads the first electronic business card information stored by a storage module in the first terminal. That is, the second terminal sends a read instruction to the NFC chip of the first terminal through a protocol. After the NFC chip of the first terminal receives the read instruction, it reads the first electronic business card information from the storage module through a communication interface, then sends the first electronic business card information to the receiving module 52 of the second terminal through the antenna of the first terminal.

The writing module 53 is connected to the power supplying module 51 and is used for writing second electronic business card information stored locally to the first terminal, such that the first terminal receives and stores the second electronic business card information under the driving of the induced electric energy.

Specifically, the writing module 53 of the second terminal launches the second electronic business card information stored locally thereof to a write instruction, and sends the write instruction through the protocol. After the first terminal receives the write instruction, the NFC chip of the first terminal write the second electronic business card information carried in the write instruction to a chip memory through the communication interface.

In the embodiment, the electronic business card exchange is achieved by way of receiving by a first terminal in a power-off state an induced electric energy provided by a second terminal, sending by the first terminal the first electronic business card information stored locally to the second terminal under the driving of the induced electric energy, then receiving and storing second electronic business card information written by the second terminal. The technical problem in the prior art that the electronic business card information exchange can not be achieved when one of two terminals is in a power-off state is solved.

Figure 6:
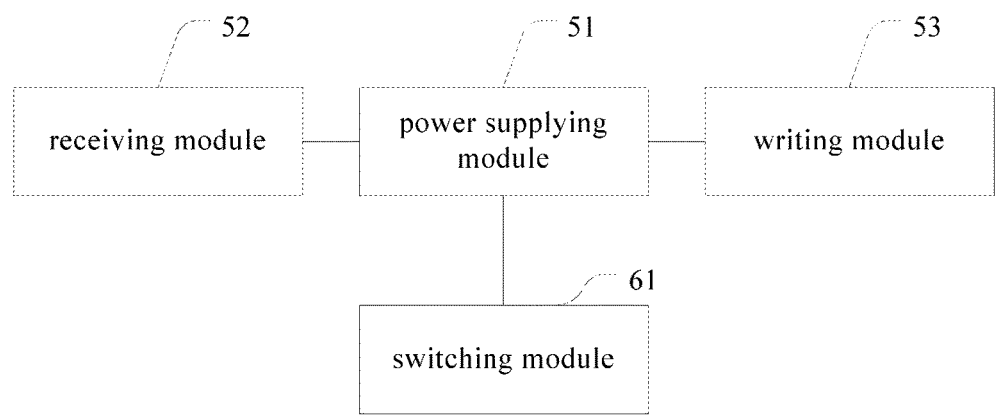
FIG. 6 is a schematic structure view of an electronic business card information exchange device according to another embodiment of the present invention.

FIG. 6 is a schematic structure view of an electronic business card information exchange device according to another embodiment of the present invention. On the basis of the above embodiment, the electronic business card information exchange device of the embodiment further includes: a switching module 61.

The power supplying module 51 is specifically used for providing the induced electric energy to the first terminal by adopting a near filed communication (NFC) manner of a non-reading and non-writing mode.

Based on this, the switching module 61 is connected to the power supplying module 51 and is used for switching the communication manner thereof to the NFC manner of a reading and writing mode if identifying that the communication manner of the first terminal is the NFC manner of a card mode.

Specifically, the switching module 61 of the second terminal provides the induced electric energy and may achieve a first communication with the first terminal at the same time. Through the first communication, the switching module 61 identifies that the first terminal is in the power-off state and the NFC chip of the first terminal works in the card mode. At this time, if the NFC chip of the second terminal works in the P2P mode or the card mode, the switching module 61 switches the working state of the NFC chip of the second terminal to the reading and writing mode, such that the communication manner of the second terminal is switched to the NFC manner of the reading and writing mode In the embodiment, the electronic business card exchanging is achieved by way of receiving by a first terminal in a power-off state an induced electric energy provided by a second terminal, sending by the first terminal the first electronic business card information stored locally to the second terminal under the driving of the induced electric energy, then receiving and storing second electronic business card information written by the second terminal. The technical problem in the prior art that the electronic business card information exchanging can not be achieved when one of two terminals is in a power-off state is solved.

It may be understood by those having ordinary skills in the art that the all or a part of steps of implementing the foregoing embodiments may be finished through relevant hardware instructed by a program. The program may be stored in a mobile device or a computer readable storage medium, and the program while performing includes the steps of the foregoing embodiments of the method. While the aforementioned storage medium includes: various mediums that can store program codes such as ROM, RAM, magnetic disk or optical disk.

It should be finally noted that the above embodiments are only configured to explain the technical solutions of the present invention, but are not intended to limit the present invention. Although the present invention has been illustrated in detail according to the foregoing embodiments, those having ordinary skills in the art should understand that modifications can still be made to the technical solutions recited in various embodiments described above, or equivalent substitutions can still be made to a part of technical features thereof, and these modifications or substitutions will not make the essence of the corresponding technical solutions depart from the spirit and scope of the claims.

What is claimed is:

1. An electronic business card information exchange method, characterized in that, comprising:
    a first terminal in a power-off state obtaining an induced electric energy provided by a second terminal;
    the first terminal sending first electronic business card information stored locally to the second terminal under the driving of the induced electric energy;
    the first terminal receiving and storing second electronic business card information written by the second terminal under the driving of the induced electric energy;
    wherein, the first terminal which is in the power-off state obtaining the induced electric energy provided by the second terminal comprises:
    the first terminal sensing and obtaining the induced electric energy by adopting a near field communication (NFC) manner of a card mode;
    before the first terminal which is in the power-off state receiving the induced electric energy provided by the second terminal further comprises:
    the first terminal detecting a remaining electricity;
    if the remaining electricity is less than a predetermined threshold, the first terminal switching the communication manner to the NFC manner of the card mode.

2. The electronic business card information exchange method according to claim 1, which is characterized in that, after the first terminal receiving and storing second electronic business card information written by the second terminal under the driving of the induced electric energy further comprises:
    after the first terminal is powered on, the first terminal displaying the second electronic business card information.

3. An electronic business card information exchange device, characterized in that, the electronic business card information exchange device is configured in a first terminal, the first terminal is an electronic business card terminal, and the electronic business card information exchange device comprises:
    a power supplying module, for obtaining an induced electric energy provided by a second terminal under the first terminal is in a power-off state;
    a first driving module, for sending first electronic business card information stored locally to the second terminal under the driving of the induced electric energy;
    a second driving module, for receiving and storing second electronic business card information written by the second terminal under the driving of the induced electric energy;
    wherein, the power supplying module is specifically used for sensing and obtaining the induced electric energy by adopting a near field communication (NFC) manner of a card mode;
    the electronic business card information exchange device further comprises:
    a detecting module, for detecting a remaining electricity;
    a switching module, for if the remaining electricity is less than a predetermined threshold, switching the communication manner to the NFC manner of the card mode.

4. The electronic business card information exchange device according to claim 3, which is characterized in that, the electronic business card information exchange device further comprises:
    a displaying module, for after the first terminal is powered on, displaying the second electronic business card information.

* * * * *